Oct. 30, 1956 T. RUSSELL 2,768,660
LIQUID MEASURING DISPENSER
Filed Jan. 15, 1954 2 Sheets-Sheet 1

INVENTOR.
THEODORE RUSSELL
BY H. G. Manning
ATTORNEY

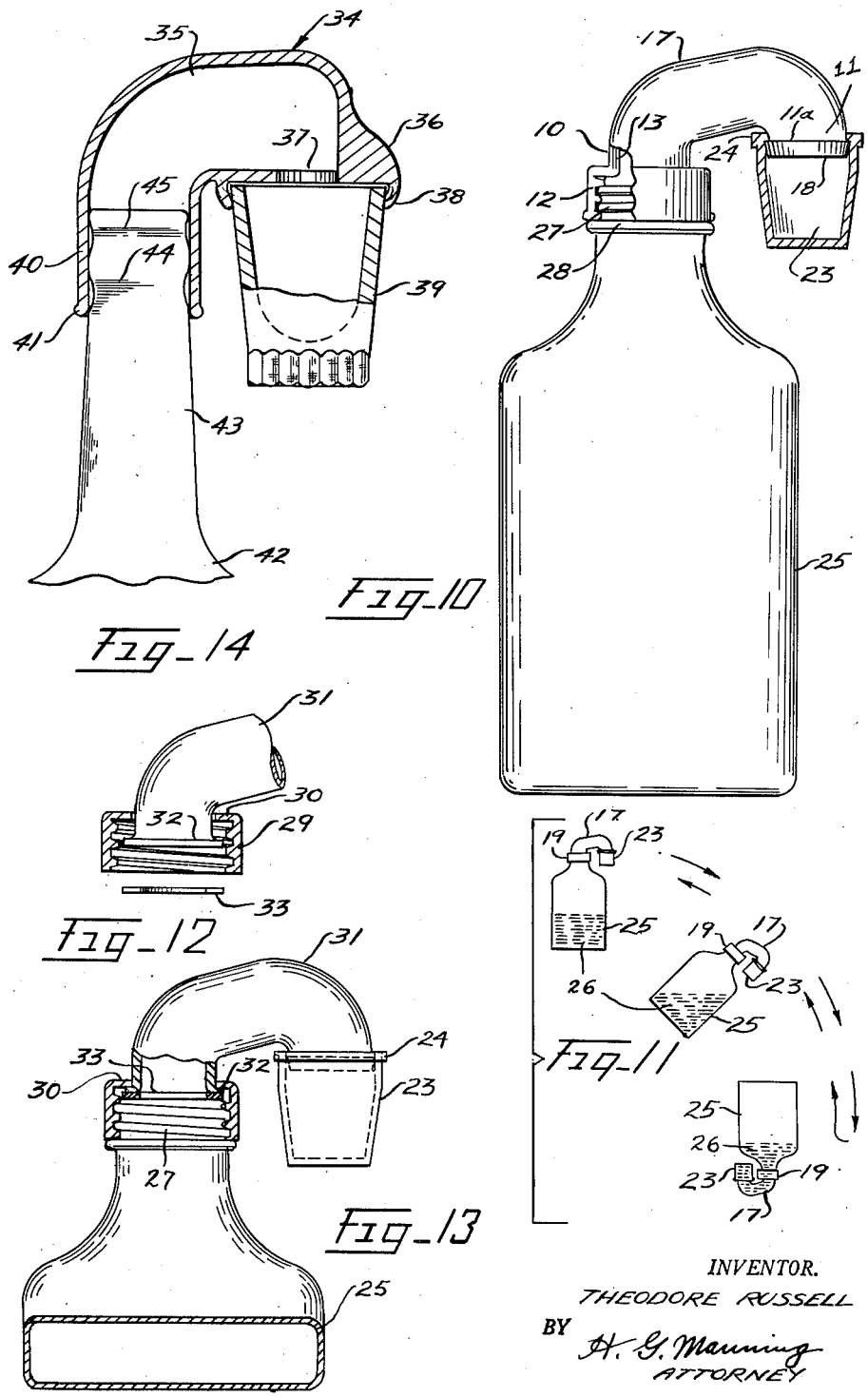

United States Patent Office 2,768,660
Patented Oct. 30, 1956

2,768,660

LIQUID MEASURING DISPENSER

Theodore Russell, Naugatuck, Conn.

Application January 15, 1954, Serial No. 404,169

3 Claims. (Cl. 141—319)

This invention relates to dispensers and more particularly to a dispenser for delivering a measured quantity of liquid such as a medicine or liquor from a bottle into a measuring cup detachably secured to said dispenser.

One object of the present invention is to provide an accurate measuring device of the above nature comprising a U-shaped tubular elbow, the ends of which can be removably secured to the neck of a bottle, and a measuring cup respectively, whereby a predetermined quantity of said liquid may be delivered into said cup by tilting the bottle 180 degrees, and then returning it to its original position.

A further object is to provide a dispenser of the above nature in which a measuring cup having a capacity of a single teaspoon may be readily attached to and detached from the elbow whereby a measured quantity of one teaspoon can be obtained from the bottle, without requiring the use of a spoon.

A further object is to provide a dispensing device of the above nature which will be simple in construction, inexpensive to manufacture, easy to install and manipulate, compact, ornamental in appearance, and very efficient and durable in use.

With these and other objects in view, there have been illustrated on the accompanying drawings several forms in which the invention may conveniently be embodied in practice.

In the drawings,

Fig. 10 is a side elevation of a medicine bottle having the U-shaped elbow dispenser attached thereto, said view being shown partly in section, and with parts broken away.

Fig. 11 is a diagrammatic view showing the successive steps in the operation of filling the measuring cup with liquid from a medicine bottle.

Fig. 12 is an exploded view showing a portion of a modified form of dispensing elbow, and a detachable screw coupling and washer for connecting it to a medicine bottle.

Fig. 13 is a side view, partly in section, of a medicine bottle having the modified form of detachable dispensing coupling attached thereto.

Fig. 14 is a side elevation, partly in section, of the upper portion of a liquor bottle, having a non-threaded L-shaped dispensing elbow of yieldable elastic material, forced over the neck of said bottle.

Figure 2:
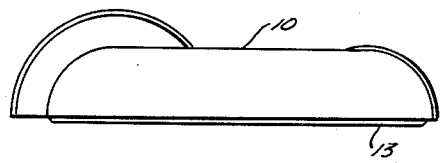
Fig. 2 is a plan view of the same.
Figure 3:
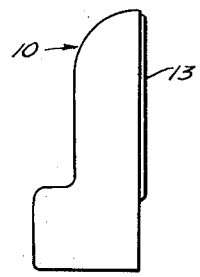
Fig. 3 is a side elevation of the same.
Figures 1, 4:
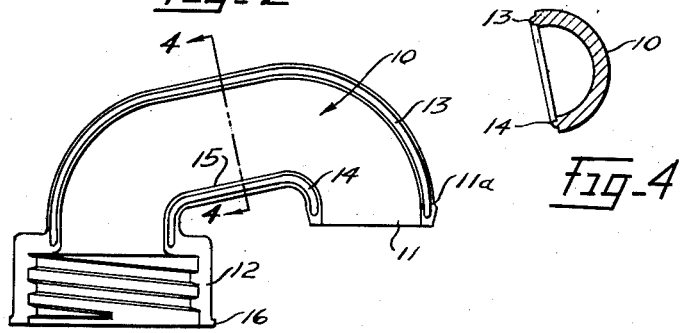
Fig. 1 represents a side elevation of the male half of the dispensing elbow.
Fig. 4 is a cross-sectional view of the same, taken along the line 4—4 of Fig. 1, looking in the direction of the arrows.
Figure 8:
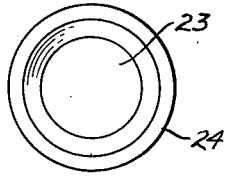
Fig. 8 is a top plan view of the measuring cup.
Figure 5:
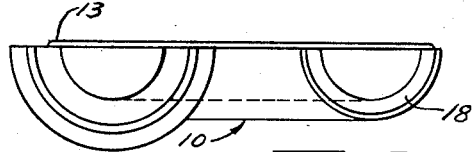
Fig. 5 is a bottom plan view of the same.
Figure 9:
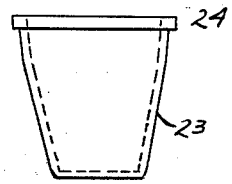
Fig. 9 is a side view of the same.
Figure 6:
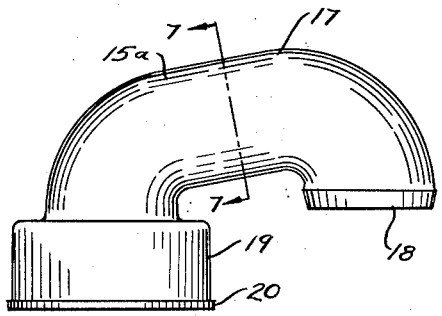
Fig. 6 is a side elevation of the female half of the dispensing elbow.

Referring now to the drawings, in which like reference numerals denote corresponding parts throughout the several views, the numeral 10 indicates the male half of a U-shaped tubular dispensing elbow, the depending ends 12 and 11 of which are adapted to be attached to the neck of a flat medicine bottle 25 and to a tapered measuring cup 23, respectively.

Figure 7:
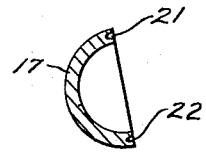
Fig. 7 is a cross-sectional view of the same taken along the line 7—7 of Fig. 6.

The cup-attaching section 11 is tapered and unthreaded and has a shoulder 11a for detachably receiving a cup 23, of one-teaspoon capacity, having a cylindrical top flange 24. The bottle-coupling section 12 has steep pitched internal threads to permit it to be rapidly connected to and disconnected from a medicine bottle. The coupling section 12 is also provided with a narrow curved elongated rib 13, adjacent its upper edge, and a narrow curved rib 14 adjacent its lower edge for detachably interfitting with similar curved grooves 21 and 22 on the female half 17 of the elbow. (See Fig. 7.)

The screw coupling section 12 is provided with an out-turned flange 16 at its lower end and the interior threads of said coupling detachably engage the screw top 27 of the bottle 25.

The male and female halves 10 and 17 of the tubular dispensing elbow are provided with intermediate sections 15 and 15a, respectively, which are inclined downwardly from the cup attaching section 11 to the bottle-coupling section 12 to permit the liquid to drain rapidly from the cup 23 after it has been filled, in a manner to be described later.

The female half 17 of the tubular dispensing elbow is provided with an unthreaded cup attaching section 18 and an enlarged threaded bottle-attaching section 19, which sections are complementary to the corresponding sections 11 and 12 of the male half 10. Provision is also made of a cylindrical flange 20 on the coupling section 19 which is complementary to the flange 16 of the male section.

The tapered cup 23 is formed preferably from yieldable elastic plastic material, such as transparent polyethylene, while the U-shaped elbow is preferably constructed from rigid transparent plastic.

Below the screw top 27 of the bottle 25, provision is made of a rounded rib 28 forming a stop against which the threaded coupling sections 12 and 19 of the male and female halves 10 and 17 are adapted to be screwed, after said halves have first been interfitted and cemented together to form a unitary tubular dispenser elbow.

The cup end of the elbow should be constructed as close as possible to the bottle end thereof, and also should lie in the plane of the medicine bottle when the latter is flattened, for compactness.

*Operation*

In the operation of the first form of the invention, after the assembled U-shaped dispensing elbow has been screwed upon the screw top 27 of the bottle 25 filled with liquid medicine 26, said bottle will be inverted by swinging the same to the right in a clockwise direction through an angle of 180 degrees. The bottle 25 will then be swung backward in the reverse direction to the original position shown in Fig. 10, whereupon the surplus liquid 26 will drain back into said bottle, leaving exactly one teaspoon of liquid in the tapered cup 23. The cup 23 may then be easily detached from the elbow and poured directly into the patient's mouth, or into a glass, if the medicine is to taken with water. If the dosage is more than one teaspoon, the cup filling operation will be repeated for each additional teaspoonful required.

Modified forms

In the second form of the invention shown in Figs. 12 and 13, provision is made of a U-shaped dispensing elbow 31, of rigid plastic material having a separate detachable threaded bottle coupling 29.

The coupling 29 has an inturned top flange 30 for engagement by an outturned flange 32 on the elbow 31, said flange 32 seating tightly against a washer 33 located upon the screw top 27.

In the third form of the invention shown in Fig. 14, provision is made of an L-shaped tubular dispensing elbow 34 constructed of yieldable elastic plastic material, said elbow having a horizontal upper section 35 to which a tapered measuring "one shot" glass 39 is adapted to be detachably secured. The horizontal upper section 35 has a central aperture 37 adjacent to which is a thickened section 36, and surrounding which is a resilient depending rib 38. The elbow 34 has a bottle attaching leg 40 having a rounded bottom rib at the lower end thereof, which may be resiliently attached to an upper tapered neck 43 of a glass liquor bottle 42, said neck being provided with the usual pair of spaced grooves 44, 45.

To fill the glass 39, the liquor bottle 42 will be inverted by swinging it 180 degrees in a clockwise direction, and then returned to the upright position shown in Fig. 14, exactly as in the operation of the first form of the invention as shown in Fig. 11.

It will be understood that if desired, the end of the resilient elbow which is adjacent the bottle 42 may be constricted, so that it can be pushed inside the bottle neck 43 like a cork, within the scope of this invention, instead of embracing the periphery of the bottle neck as herein disclosed.

The improved liquid measuring dispenser herein disclosed may be sold as a separate item or may be included as an accessory in the package with a bottle of medicine.

While there have been disclosed in this specification, several forms in which the invention may be embodied, it is to be understood that these forms are shown for the purpose of illustration only and that the invention is not to be limited to the specific disclosures, but may be modified and embodied in various other forms without departing from its spirit. In short, the invention includes all the modifications and embodiments coming within the scope of the following claims.

Having thus fully described the invention, what is claimed as new and for which it is desired to secure Letters Patent is:

1. In a liquid measuring and dispensing device, the combination including a tubular element having a downwardly directed leg at one end shaped to be detachably connected with the neck of a bottle to position said tubular element upwardly inclined away from the top of said bottle, the other end of said tubular element being provided with a horizontal bottom opening, said opening having a circular coupling means to provide a liquid tight detachable connection with the upper end of a cup, to position the rim of said cup substantially horizontal and level with the bottom of the upper end of said tubular element, whereby after said cup has been filled by reversal of said bottle, said cup may be detached without an overflow of liquid therefrom.

2. The invention as defined in claim 1, wherein said coupling means at the other end of said tubular element includes a generally conical shoulder to engage with the interior surface of a cup.

3. The invention as defined in claim 1, wherein said coupling means at the other end of said tubular element includes a yieldable rib to engage the exterior surface of a cup.

References Cited in the file of this patent

UNITED STATES PATENTS

| Number | Name | Date |
|---|---|---|
| 391,967 | Hennig | Oct. 30, 1888 |
| 400,298 | Carrasco | Mar. 26, 1889 |
| 1,438,892 | Boykin | Dec. 12, 1922 |
| 1,637,557 | Depue | Aug. 2, 1927 |
| 1,664,816 | Hansen | Apr. 3, 1928 |
| 2,385,195 | Clower | Sept. 18, 1945 |
| 2,475,720 | Preston | July 12, 1949 |
| 2,501,636 | Smith | Mar. 21, 1950 |
| 2,587,344 | Livingstone | Feb. 26, 1952 |
| 2,678,753 | Hersey | May 18, 1954 |
| 2,698,700 | Grosh | Jan. 4, 1955 |

FOREIGN PATENTS

| Number | Country | Date |
|---|---|---|
| 17,913 | Australia | June 8, 1934 |